(12) United States Patent
El-Assir

(10) Patent No.: US 11,137,501 B2
(45) Date of Patent: Oct. 5, 2021

(54) SYSTEM FOR MEASURING INTER CHANNEL LATENCIES AND METHOD OF MEASURING INTER CHANNEL LATENCIES

(71) Applicant: Rohde & Schwarz GmbH & Co. KG, Munich (DE)

(72) Inventor: Rachid El-Assir, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 261 days.

(21) Appl. No.: 16/285,069

(22) Filed: Feb. 25, 2019

(65) Prior Publication Data

US 2020/0271793 A1  Aug. 27, 2020

(51) Int. Cl.
*G01S 19/24*  (2010.01)

(52) U.S. Cl.
CPC ..................... *G01S 19/24* (2013.01)

(58) Field of Classification Search
CPC .......... G01S 19/24; G01S 19/30; G01S 19/29; G01S 19/37; G01S 19/34
USPC .................................................... 324/357.63
See application file for complete search history.

(56) References Cited

U.S. PATENT DOCUMENTS

| | | | | |
|---|---|---|---|---|
| 5,280,629 A | * | 1/1994 | Lo Galbo | H04H 20/67 375/359 |
| 6,175,725 B1 | * | 1/2001 | Auber | G01S 19/29 342/357.68 |
| 6,967,992 B1 | * | 11/2005 | Rabaeijs | G01S 19/30 342/357.29 |
| 9,917,661 B2 | * | 3/2018 | Wen | H04B 17/14 |
| 2002/0075945 A1 | * | 6/2002 | Farine | H04B 1/707 375/148 |
| 2008/0191932 A1 | * | 8/2008 | Hemming | H04B 1/7075 342/196 |

FOREIGN PATENT DOCUMENTS

| WO | 2016/064376 A1 | 4/2016 | |
|---|---|---|---|
| WO | WO-2016064376 A1 | * 4/2016 | ............ H04W 88/06 |

* cited by examiner

*Primary Examiner* — Harry K Liu
(74) *Attorney, Agent, or Firm* — Christensen O'Connor Johnson Kindness PLLC

(57) ABSTRACT

A system for measuring inter channel latencies between more than one transmission channel, comprises a signal source module configured to provide at least one signal. The system also comprises at least two transmission channels assigned to the signal source module, wherein signals propagate through the at least two transmission channels. The signals have a modulated global navigation satellite system (GNSS) waveform. Moreover, the system has at least one switch module assigned to the at least two transmission channels. Further, the system comprises at least one GNSS receiver module assigned to the at least one switch module. The at least one switch module is configured to connect an input of the at least one GNSS receiver module to each single transmission channel. The GNSS receiver module is configured to determine at least one of a time delay and a phase difference between the at least two transmission channels.

19 Claims, 1 Drawing Sheet

SYSTEM FOR MEASURING INTER CHANNEL LATENCIES AND METHOD OF MEASURING INTER CHANNEL LATENCIES

FIELD OF THE DISCLOSURE

Embodiments of the present disclosure generally relate to a system for measuring inter channel latencies between more than one transmission channel. Further, embodiments of the present disclosure generally relate to a method of measuring inter channel latencies between more than one transmission channel.

BACKGROUND

Nowadays, communication systems and devices are used in wide areas of technical applications, particularly radio frequency communication systems and devices. The communication systems and devices require testing and, in some cases, calibration for proper work. Testing and calibration can present challenges in case of a communication system or device, which provides multiple transmission and reception channels such as multi-array systems or devices, for instance multi-input, multi-output (MIMO) systems or devices.

In the state of the art, single-channel measurement instruments are used to test and calibrate each channel of a multi-channel communication device individually, namely in a subsequent manner. However, the repeated connection and disconnection of the single-channel measurement instrument to the multichannel communication device, namely the device under test (DUT), using appropriate connectors will influence the accuracy and repeatability. Moreover, the time required to perform test and calibration increases with the number of channels to be tested. As the trend is to implement so-called massive MIMO communication systems or devices, the number of channels is very extremely large such that testing is very time consuming.

In addition, multi-channel test instruments are known that can be used to test the several channels in parallel. However, those test instruments are extremely expensive in case of many channels to be tested in parallel.

In US 2013/17318623 A1, a system is described that uses a combiner network in order to connect the device under test (DUT) with a single-channel measurement instrument, for instance a signal analyzer. The combiner network ensures that only one signal is forwarded to the single-channel measurement instrument. Further, the system has a signal generator that generates a plurality of orthogonal baseband sequences to a corresponding plurality of radio frequency transmitters of the device under test that generate radio frequency signals forwarded to the combiner network. However, this system is not able to work at very low powers.

Accordingly, there is a need for a possibility to calibrate components used in communication systems in an efficient manner with high accuracy.

SUMMARY

Embodiments of the present disclosure provide a system for measuring inter channel latencies between more than one transmission channel. In some embodiments, the system comprises:

a signal source module configured to provide at least one signal;

at least two transmission channels assigned to the signal source module, signals propagating through the at least two transmission channels, the signals having a modulated global navigation satellite system (GNSS) waveform;

at least one switch module assigned to the at least two transmission channels; and at least one GNSS receiver module assigned to the at least one switch module;

the at least one switch module being configured to connect an input of the at least one GNSS receiver module to each single transmission channel, the GNSS receiver module being configured to determine at least one of a time delay and a phase difference between the at least two transmission channels, the time delay between the at least two transmission channels being calculated based on absolute times determined for the signals processed by the at least two transmission channels.

Further, embodiments of the present disclosure provide a method of measuring inter channel latencies between more than one transmission channel, with the following steps:

Generating at least one signal;

Forwarding the at least one signal to at least two transmission channels,

Connecting an input of a global navigation satellite system (GNSS) receiver module to each single transmission channel of the at least two transmission channels via a switch module; and Determining via the GNSS receiver module at least one of a time delay and a phase difference between the at least two transmission channels that process the signals having a GNSS waveform, wherein the time delay between the at least two transmission channels is calculated based on absolute times determined for the signals processed by the at least two transmission channels.

Accordingly, multi-channel systems, devices or components thereof, for instance multi-array sources, multi-array receivers or channels, can be calibrated by the respective system as inter channel latencies are measured that occur between the at least two transmission channels. In fact, inter channel time and phase calibrations are ensured by using signals having a GNSS waveform that are received and analyzed by the respective GNSS receiver. Hence, the inter channel latencies measured may occur in a generator, a transmit-receive module (TRM), a passive element, a receiver and/or an analyzer provided that multiple transmission channels are assigned thereto.

In general, global navigation satellite systems (GNSS), for instance a global positioning system (GPS), provide positioning information. Typically, a global navigation satellite system requires at least four satellites in the orbit in order to enable the system to calculate a three-dimensional position of a respective GNSS receiver as well as a constant time bias between the satellite clocks and the receiver clock.

In some embodiments, the estimated ranges from all satellites to the receiver, namely the GNSS receiver, are used to calculate the three-dimensional position. The calculation typically uses least square algorithms and follows trilateration principles according to which the respective range corresponds to the travelled distance at speed of light from a satellite to the GNSS receiver and at the same time the radius of a trilateration sphere centered around the respective satellite. Hence, the position of the GNSS receiver, under idle conditions, corresponds to the intersection of the different spheres centered around the satellites.

Thus, the GNSS receiver module has at least two input channels, for example two radio frequency input channels, via which the GNSS receiver module is connected with the switch module.

The switch module may comprise or be established by at least one power combiner assigned to the transmission channels, for example a combiner network.

An aspect provides that the GNSS receiver module comprises a processor and a GNSS receiver. Thus, a typical GNSS receiver may be used that is able to indicate/output/display the respective time delay and/or the phase difference calculated by the processor. The processor may be an additional one that can be established in an integrated manner or rather separately wherein the separately formed processor is connected to the GNSS receiver.

Another aspect provides that the GNSS receiver module is established by a hardware module. The GNSS receiver module may be established by hardware components that are typically used for forming a real GNSS receiver. In some embodiments, the hardware components can include digital circuits, analogs circuits, or combinations thereof.

In other embodiments, the GNSS receiver module may be established by a software module. In some embodiments, software runs on a processor, or the processor is specifically programmed, to form a specially configured computing device for simulating the (hardware) GNSS receiver module.

Furthermore, the signal source module corresponds to a radio frequency signal source, wherein the at least two transmission channels are radio frequency channels. Thus the signal source module is configured to generate a radio frequency signal (RF signal) that may have a modulated GNSS waveform. The respective radio frequency signal is outputted and forwarded to the transmission channels established by radio frequency channels that process the radio frequency signal(s) appropriately.

In some embodiments, the signal source module corresponds to a radio frequency simulation module configured to simulate a radio frequency signal. Thus, the radio frequency signal is only simulated by the signal source module.

Generally, the signal provided by the signal source module may relate to a generated one or rather a replayed one that was stored previously.

According to another aspect, the at least one frequency converter is located between an input of the GNSS receiver module and the at least two transmission channels. The frequency of the signals processed by the at least two transmission channels may be down- or up-converted to a certain frequency that can be processed by the subsequent GNSS receiver module.

In some embodiments, the at least one frequency converter is located between an input of the GNSS receiver module and the at least one switch module. Accordingly, the at least one switch module processes the signals as received by the transmission channels wherein the respective signals are down- or up-converted downstream of the at least one switch module.

According to an embodiment, the at least one frequency converter is configured to convert the signals into a GNSS frequency band. This ensures that the GNSS receiver module is enabled to process the respective signals inputted. For instance, the signals are converted into one of the GNSS frequencies such as a L1 frequency at 1.57542 GHz. The signals having the respective GNSS frequency are fed to the GNSS receiver module for evaluating or rather measuring purposes.

Moreover, the signal source module is assigned to an intermediate frequency output of a spectrum analyzer, a radio frequency source with a passive radio frequency component connected, a signal generator without output path, a radio frequency signal generator and/or a radio frequency transceiver. Thus, different devices may be used for providing the respective signal that is forwarded to the transmission channels.

Furthermore, the respective devices may encompass the transmission channels such that these devices correspond to devices under test.

According to an aspect, if the signal source module is assigned to an intermediate frequency output of a spectrum analyzer, the system is configured to use the time delay calculated for calibrating a radio frequency input of an oscilloscope, a spectrum analyzer, a receiver, a signal analyzer and/or a network analyzer. The transmission channels may relate to receiving channels of the oscilloscope, the spectrum analyzer, the receiver, the signal analyzer and/or the network analyzer such that the respective component can be calibrated appropriately, for example its input.

According to another aspect, if the signal source module is assigned to a signal generator without output path, the system is configured to use the time delay calculated for calibrating at least one signal generator output channel. The output path of the signal generator may correspond to the transmission channels. Accordingly, the transmission channels, namely the output path of the signal generator, can be calibrated appropriately.

Another aspect provides, if the signal source module corresponds to radio frequency signal generator with a passive radio frequency component connected, the system is configured to use the time delay calculated for calibrating the passive radio frequency component. The passive radio frequency component connected to the RF signal generator may be a channel, namely one of the transmission channels, that is calibrated appropriately.

Moreover, at least one of the signal source module and the at least one switch is integrated in at least one of a receiver, an analyzer and an oscilloscope. Further, the respective device may also comprise the (optional) frequency converter. The device may also comprise the at least two transmission channels, namely the radio frequency input channels.

The GNSS receiver module may have a sensitivity lower that −120 dBm. Thus, the GNSS receiver module works at very low powers.

Another aspect provides that the signal source module is configured to replay at least one previously recorded signal having the modulated GNSS waveform. Thus, the signal used for measuring inter channel latencies may relate to a simulated or rather pre-recorded GNSS signal.

The transmission channels may be assigned to a device under test, the device under test being at least one of a signal generator, a signal source, an analyzer, an oscilloscope, a receiver and a channel arrangement. Accordingly, the system is enabled to calibrate at least one of the devices mentioned above wherein time and phase calibrations are done.

Put another way, to calibrate multi-array sources or channel like MIMO sources at a user-defined frequency, a simulated or rather pre-recorded signal, namely the signal having the modulated GNSS waveform, is loaded on one or multiple signal generator ports, for instance RF ports. The respective signal provided is modulated on a certain frequency that is of interest for the user. Then, the respective signal is routed to all transmission channels to be calibrated with respect to each other wherein the respective channels are relatively calibrated with regard to time and phase.

For doing so, the switch module may select one channel of the at least two channels at a time for processing the respective signal.

As the frequency selected by the user does not necessarily be a GNSS frequency, the frequency converter may be provided in order to down- or up-convert the frequency to a GNSS frequency. Afterwards, the respective signal, namely the down- or up-converted signal, is fed to the GNSS receiver module for evaluation or rather measurement.

The GNSS receiver module resolves position and time information such that time bias of every single transmission channel is resolved at a time. Hence, the absolute times may be gathered.

The time difference between the time biases resolved for the different transmission channels corresponds to the difference in propagation time of the different transmission channels to be calibrated such that inter channel time calibration is possible.

Moreover, multi-array receivers may be calibrated by the system. Therefore, one signal may be generated, for example a GNSS signal, namely a signal with a GNSS waveform. The signal is fed to the different transmission channels that correspond to receiver channels of the multi-array receiver to be calibrated, namely the device under test.

Each of the channels generates an intermediate frequency signal at a GNSS frequency, which are fed to the switch module. Then, the respective intermediate frequency signals are forwarded to the GNSS receiver module in order to determine the inter channel latencies.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
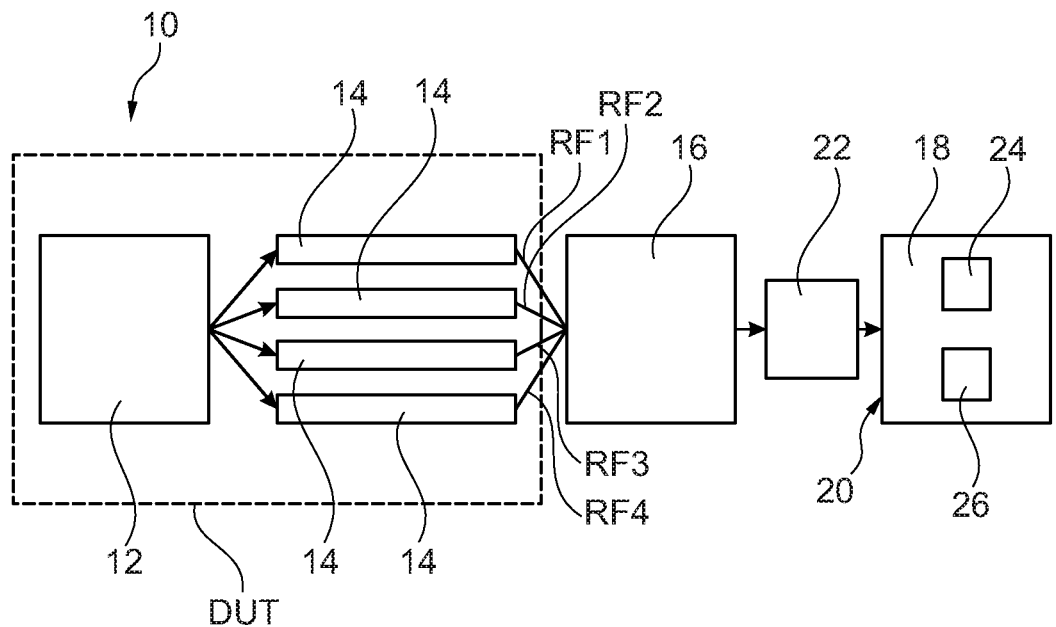
FIG. 1 schematically shows an example of a system for measuring inter channel latencies according to a first embodiment of the present disclosure.

In FIG. 1, a system 10 for measuring inter channel latencies is shown that comprises a signal source module 12 that is configured to provide at least one signal that is used for measuring inter channel latencies. The signal source module 12 is connected with at least two transmission channels 14. In the shown embodiment, four transmission channels 14 are provided between which the inter channel latencies are measured by the system 10 as will be described later.

The at least one signal provided by the signal source module 12 is forwarded to the transmission channels 14 which process the respective signal individually such that a respective signal propagates through each transmission channel 14. The signals propagating through the transmission channels 14 have a modulated global navigation satellite system (GNSS) waveform in some embodiments. For instance, the signal provided by the signal source module 12 may already have a GNSS waveform.

The system 10 may also comprise at least one switch module 16 that is located downstream of the transmission channels 14. The switch module 16 is located between the transmission channels 14 and at least one GNSS receiver module 18 that has at least one input 20, for example several inputs, which is connected to each single transmission channel 14 via the at least one switch module 16 depending on the switching state of the at least one switch module 16.

In the shown embodiment, the system 10 further comprises a frequency converter 22 that is located between the at least one switch module 16 and the input 20 of the GNSS receiver module 18. Alternatively, the frequency converter 22 may be located between the input 20 of the GNSS receiver module 18 and the transmission channels 14, namely between the transmission channels 14 and the at least one switch module 16.

In general, the GNSS receiver module 18 is configured to determine at least one of a time delay and phase difference (time delay and/or phase difference) between the different transmission channels 14 that process the signals with the GNSS waveform. In some embodiments, the time delay between the different transmission channels 14 is calculated by the GNSS receiver module 18 based on absolute times determined for the signals processed by the different transmission channels 14. The GNSS receiver module 18 may comprise a (regular) GNSS receiver 24 with two or more radio frequency inputs as well as a processor 26 that is integrated in the GNSS receiver 24.

In the shown embodiment, the processor 26 is separately formed, but connected with the GNSS receiver 24. Generally, the GNSS receiver module 18 may be established by a hardware module as shown in FIG. 1. Alternatively, the GNSS receiver module 18 may be established by a software module that runs on a processor of the system 10.

The signal source module 12 may correspond to a radio frequency simulation module that generates radio frequency signals having a GNSS waveform. The respective radio frequency signal is forwarded to the transmission channels 14 that correspond to radio frequency channels.

Hence, radio frequency signals are processed by the at least one switch module 16 wherein the radio frequency signals having a radio frequency may be down- or up-converted by the at least one frequency converter 24 into a GNSS frequency band that can be processed by the GNSS receiver module 18 located downstream of the at least one frequency converter 24.

Thus, a user of the system 10 is enabled to choose a frequency of interest for evaluating inter channel latencies between the transmission channels 14.

The signal source module 12 and the transmission channels 14 may relate to a device under test that is calibrated by the system 10.

In some embodiments, the device under test may be assigned to a signal generator, a radio frequency signal generator, a radio frequency source, a radio frequency transceiver or a transmit receive module (RTM). For instance, the device under test corresponds to a multi-array source or rather MIMO source.

Accordingly, the system 10 according to FIG. 1 can be used to calibrate a multi-array source or channel like a MIMO source at a user-defined frequency. Therefore, a simulated or rather pre-recorded signal, namely the signal having the modulated GNSS waveform, is loaded on one or multiple signal generator ports, for instance RF ports, of the device under test (DUT).

The respective signal provided is modulated on a certain frequency that is of interest for the user. Then, the respective signal is routed to all transmission channels 14 to be calibrated with respect to each other wherein the respective channels 14 are relatively calibrated with regard to time and phase.

For doing so, the switch module 16 selects one channel 14 of the channels 15 at a time for processing the respective signal.

As the frequency selected by the user does not necessarily be a GNSS frequency, the frequency converter 22 down- or up-converts the frequency to a GNSS frequency. Afterwards, the respective signal, namely the down- or up-converted signal, is fed to the GNSS receiver module 18 for evaluation or rather measurement.

The GNSS receiver module 18 resolves position and time information from the signal(s) received such that time bias of every single transmission channel 14 is resolved at a time. In other words, the absolute times are obtained.

The time difference between the time biases resolved for the different transmission channels 14 corresponds to the difference in propagation time of the different transmission channels 14 to be calibrated.

Figure 2:
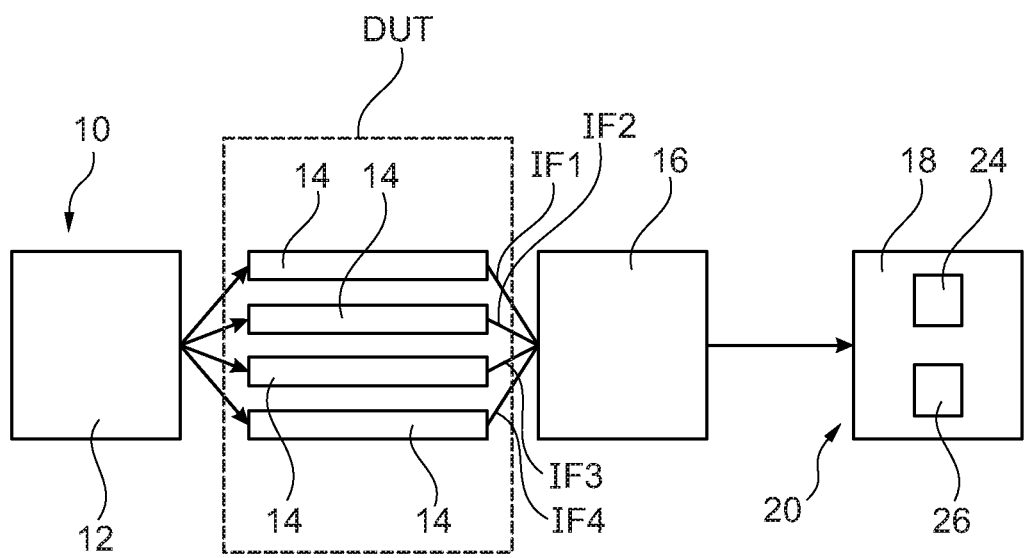
FIG. 2 schematically shows an example of a system for measuring inter channel latencies according to a second embodiment of the present disclosure.

In FIG. 2, an alternative embodiment is shown that distinguishes from the one shown in FIG. 1 in that no frequency converter 24 is provided. The system 10 shown in FIG. 2 is used to calibrate a receiver, for example a multi-array receiver, an analyzer, an oscilloscope or a transmit receive module (RTM).

The signal source module 12 may be established by a radio frequency simulation module that generates a radio frequency signal fed to the transmission channels 14, namely a GNSS signal or rather a signal having a GNSS waveform.

Each transmission channel 14 is configured to generate an intermediate frequency (IF) signal at a GNSS frequency that is forwarded to the switch module 16 and subsequently to the GNSS receiver module 18 located downstream of the switch module 16.

Accordingly, multi-array receivers may be calibrated by the system 10 shown in FIG. 2.

Therefore, one signal may be generated by the signal source module 12, for example a GNSS signal, namely a signal with a GNSS waveform. The signal is fed to the different transmission channels 14 that correspond to receiver channels of the device under test (DUT) to be calibrated, for instance the multi-array receiver.

Each of the channels 14 generates an intermediate frequency (IF) signal at a GNSS frequency, which are fed to the switch module 16. Then, the respective intermediate frequency signals are forwarded to the GNSS receiver module 18 subsequently in order to analyze the inter channel latencies. Accordingly, the transmission channels 14 may be calibrated with regard to time and phase.

Comparing the embodiments shown in FIGS. 1 and 2 reveals that the device under test (DUT) to be calibrated by the system 10 with respect to time and phase may correspond to a signal generating device or rather a receiving device. In FIG. 1, the DUT may comprise the signal source module 12 and the transmission channels 14, whereas the DUT according to FIG. 2 may comprise the transmission channels 14 that correspond to receiving channels.

As shown, different devices may be calibrated. Accordingly, the signal source module 12 may be assigned to an intermediate frequency output of a spectrum analyzer, a radio frequency source with a passive radio frequency component connected, a signal generator without output path, a radio frequency signal generator and/or a radio frequency transceiver. In fact, this depends on the device to be calibrated by the system 10.

If the signal source module 12 is assigned to an intermediate frequency output of a spectrum analyzer, the system 10 is configured to use the time delay calculated for calibrating a radio frequency input of an oscilloscope, a spectrum analyzer, a receiver, a signal analyzer and/or a network analyzer.

If the signal source module 12 is assigned to a signal generator without output path, the system 10 is configured to use the time delay calculated for calibrating at least one signal generator output channel.

If the signal source module 12 is assigned to a radio frequency signal generator with a passive radio frequency component connected, the system 10 is configured to use the time delay calculated for calibrating the passive radio frequency component.

Thus, the respective calibration depends on the kind of signal source module 12 used since this may depend on the device under test (DUT). In fact, the transmission channels 14 may be part of the device under test. Put another way, the transmission channels 14 are assigned to the device under test (DUT) that may be established by at least one of a signal generator, a signal source, an analyzer, an oscilloscope, a receiver and a channel arrangement. Each of these components used in communication systems or devices may be calibrated by the system 10 with regard to time and phase.

In general, the GNSS receiver module 18 used has a very low sensitivity, namely a sensitivity lower than −120 dBm. Therefore, the system 10 works at very low powers.

Furthermore, known techniques, namely the one assigned to global navigation satellite system (GNSS) procedures such as real-time kinematics (RTK), can be used for calibration purposes wherein these known techniques ensure high accuracy for calibrating purposes.

Generally, the signal source module 12 may replay at least one previously recorded signal, for instance a signal having the modulated GNSS waveform. Thus, a certain signal can be used for calibration purposes. Alternatively, the respective signal is simulated.

Therefore, inter channel latencies between the transmission channels 14 can be measured in a simple and accurate manner by using the GNSS receiver module 18. The inter channel latencies are used to perform time and phase calibrations.

It will be understood that one or more of the modules, such as a signal source module 12, switch module 16, GNSS receiver module 18, etc., described above may include, in some embodiments, logic for implementing the technologies and methodologies described herein. This logic of these one or more modules can be carried out in either hardware or software, or a combination of hardware and software. In an example, the functionality of the one or more modules could be implemented by special purpose hardware-based computer systems or circuits, etc., or combinations of special purpose hardware and computer instructions. In some embodiments, the one or more modules includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can include discrete digital or analog circuit elements or electronics, or combinations thereof.

In an embodiment, the one or more modules include a microprocessor and a memory storing logic modules and/or instructions. In an embodiment, the one or more modules include one or more ASICs having a plurality of predefined logic components. In an embodiment, the one or more modules include one or more FPGA having a plurality of programmable logic components. In an embodiment, the one or more modules includes combinations of circuits and computer program products having software or firmware instructions stored on one or more computer readable memories that work together to cause a device to perform one or more methodologies or technologies described herein. In an embodiment, the one or more modules includes hardware circuits (e.g., implementations in analog circuitry, implementations in digital circuitry, and the like, and combinations thereof) for carrying out the functionality described herein.

It will be appreciated that one or more aspects of the methods set forth herein can be carried out in a computer system. In this regard, one or more program elements are provided, which are configured and arranged when executed on a computer to measure inter channel latencies between more than one transmission channel. In one embodiment, the one or more program elements may specifically be configured to perform one or more of the following steps: generating at least one signal; forwarding the at least one signal to at least two transmission channels, connecting an input of a global navigation satellite system (GNSS) receiver module to each single transmission channel of the at least two transmission channels via a switch module; and determining via the GNSS receiver module at least one of a time delay and a phase difference between the at least two transmission channels that process the signals having a GNSS waveform, wherein the time delay between the at least two transmission channels is calculated based on absolute times determined for the signals processed by the at least two transmission channels. In other embodiments, the one or more program elements may specifically be configured to perform one or more of the steps of Claim 19.

The one or more program elements may be installed in memory, such as computer readable storage medium. The computer readable storage medium may be any one of the computing devices, modules, instruments, analyzers, etc., described elsewhere herein or another and separate computing device, modules, instruments, analyzers, etc., as may be desirable. The computer readable storage medium and the one or more program elements, which may comprise computer-readable program code portions embodied therein, may further be contained within a non-transitory computer program product.

As mentioned, various embodiments of the present disclosure may be implemented in various ways, including as non-transitory computer program products, computer readable instructions, etc. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, optical disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. Other non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM) of any rate, cache memory (including various levels), flash memory, register memory, and/or the like. It will be appreciated that where embodiments are described to use a computer-readable storage medium, other types of computer-readable storage media may be substituted for or used in addition to the computer-readable storage media described above.

The computer-readable media include cooperating or interconnected computer-readable media, which exist exclusively on a processing system or distributed among multiple interconnected processing systems that may be local to, or remote from, the processing system.

In some embodiments, one or more computer-readable storage media is provided containing computer readable instructions embodied thereon that, when executed by one or more computing devices (contained in or associated with the one or more modules set forth above), cause the one or more computing devices to perform one or more steps of the methods described herein. In other embodiments, one or more of these method steps can be implemented in digital and/or analog circuitry or the like.

The present application may also reference quantities and numbers. Unless specifically stated, such quantities and numbers are not to be considered restrictive, but exemplary of the possible quantities or numbers associated with the present application. Also in this regard, the present application may use the term "plurality" to reference a quantity or number. In this regard, the term "plurality" is meant to be any number that is more than one, for example, two, three, four, five, etc. The terms "about," "approximately," "near," etc., mean plus or minus 5% of the stated value. For the purposes of the present disclosure, the phrase "at least one of A, B, and C," for example, means (A), (B), (C), (A and B), (A and C), (B and C), or (A, B, and C), including all further possible permutations when greater than three elements are listed.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from The embodiments of the invention in which an exclusive property or privilege is claimed are defined as follows:

1. A system for measuring inter channel latencies between more than one transmission channel, comprising:
   a signal source module configured to provide at least one signal;
   at least two transmission channels assigned to the signal source module, signals propagating through the at least two transmission channels, the signals having a modulated global navigation satellite system (GNSS) waveform;
   at least one switch module assigned to the at least two transmission channels; and
   at least one GNSS receiver module located downstream of the at least one switch module;
   the at least one switch module being configured to connect an input of the at least one GNSS receiver module to each single transmission channel,
   the GNSS receiver module resolving position and time information such that time bias of every single transmission channel is resolved at a time, thereby determining absolute times for the signals processed by the at least two transmission channels,
   the GNSS receiver module being configured to determine at least one of a time delay and a phase difference between the at least two transmission channels, the time delay between the at least two transmission channels being calculated based on the absolute times determined for the signals processed by the at least two transmission channels.

2. The system according to claim 1, wherein the GNSS receiver module comprises a processor and a GNSS receiver.

3. The system according to claim 1, wherein the GNSS receiver module is established by a hardware module.

4. The system according to claim 1, wherein the GNSS receiver module is established by a software module.

5. The system according to claim 1 wherein the signal source module corresponds to a radio frequency signal source module, the at least two transmission channels being radio frequency channels.

6. The system according to claim 1 wherein the signal source module corresponds to a radio frequency simulation module configured to simulate a radio frequency signal.

7. The system according to claim 1, wherein at least one frequency converter is located between an input of the GNSS receiver module and the at least two transmission channels.

8. The system according to claim 7, wherein the at least one frequency converter is located between the input of the GNSS receiver module and the at least one switch module.

9. The system according to claim 7, wherein the at least one frequency converter is configured to convert the signals into a GNSS frequency band.

10. The system according to claim 1, wherein the signal source module is assigned to at least one of an intermediate frequency output of a spectrum analyzer, a radio frequency source with a passive radio frequency component connected, a signal generator without output path, a radio frequency signal generator and a radio frequency transceiver.

11. The system according to claim 10, wherein, if the signal source module is assigned to an intermediate frequency output of a spectrum analyzer, the system is configured to use the time delay calculated for calibrating a radio frequency input of at least one of an oscilloscope, a spectrum analyzer, a receiver, a signal analyzer and a network analyzer.

12. The system according to claim 10, wherein, if the signal source module is assigned to a signal generator without output path, the system is configured to use the time delay calculated for calibrating at least one signal generator output channel.

13. The system according to claim 10, wherein, if the signal source module is assigned to a radio frequency signal generator with a passive radio frequency component connected, the system is configured to use the time delay calculated for calibrating the passive radio frequency component.

14. The system according to claim 1, wherein at least one of the GNSS receiver module and the at least one switch module is integrated in at least one of a receiver, an analyzer and an oscilloscope.

15. The system according to claim 1, wherein the GNSS receiver module has a sensitivity lower than −120 dBm.

16. The system according to claim 1, wherein the signal source module is configured to replay at least one previously recorded signal having the modulated GNSS waveform.

17. The system according to claim 1, wherein the transmission channels are assigned to a device under test, the device under test being at least one of a signal generator, a signal source, an analyzer, an oscilloscope, a receiver and a channel arrangement.

18. A method of measuring inter channel latencies between more than one transmission channel, with the following steps:
   generating at least one signal;
   forwarding the at least one signal to at least two transmission channels,
   connecting an input of a global navigation satellite system (GNSS) receiver module to each single transmission channel of the at least two transmission channels via a switch module, wherein the GNSS receiver module is located downstream of the switch module;
   determining absolute times for the signals processed by the at least two transmission channels by the GNSS receiver module that resolves position and time information such that time bias of every single transmission channel is resolved at a time; and
   determining via the GNSS receiver module at least one of a time delay and a phase difference between the at least two transmission channels that process the signals having a GNSS waveform, wherein the time delay between the at least two transmission channels is calculated based on the absolute times determined for the signals processed by the at least two transmission channels.

19. The method according to claim 18, wherein the signal generated is converted into a GNSS frequency band via at least one frequency converter.

* * * * *